(12) United States Patent
Kellogg

(10) Patent No.: US 6,445,984 B1
(45) Date of Patent: Sep. 3, 2002

(54) STEER CONTROL SYSTEM FOR MATERIAL HANDLING VEHICLES

(75) Inventor: David L. Kellogg, Greene, NY (US)

(73) Assignee: The Raymond Corporation, Greene, NY (US)

( * ) Notice: Subject to any disclaimer, the term of this patent is extended or adjusted under 35 U.S.C. 154(b) by 0 days.

(21) Appl. No.: 09/865,222

(22) Filed: May 25, 2001

(51) Int. Cl.$^7$ .............................. B60T 7/16; G06F 17/00
(52) U.S. Cl. ............................ 701/23; 701/26; 701/41; 318/587
(58) Field of Search .............................. 701/23, 24, 25, 701/26, 41; 318/587, 586; 180/169, 415

(56) References Cited

U.S. PATENT DOCUMENTS

| | | | |
|---|---|---|---|
| 3,482,644 A | 12/1969 | Krieger et al. | 180/168 |
| 3,598,196 A | 8/1971 | Ballantyne et al. | 180/168 |
| 3,614,990 A | 10/1971 | Schnitzler | 318/587 |
| 3,757,887 A | 9/1973 | Moore et al. | 180/168 |
| 4,307,329 A | 12/1981 | Taylor | 318/587 |
| 4,310,789 A | 1/1982 | Mank et al. | 318/587 |
| 4,520,299 A | 5/1985 | Konrad | 318/587 |
| 4,530,057 A | 7/1985 | Ahlbom | 701/23 |
| 4,918,362 A * | 4/1990 | Christensen et al. | 180/168 |
| 5,218,542 A * | 6/1993 | Endo et al. | 180/169 |
| 5,404,087 A | 4/1995 | Sherman | 318/587 |
| 5,519,296 A | 5/1996 | Day | 318/587 |
| 5,524,723 A | 6/1996 | Gramling et al. | 180/168 |
| 5,764,014 A | 6/1998 | Jakeway et al. | 318/587 |
| 5,778,327 A | 7/1998 | Simmons et al. | 701/23 |
| 5,938,707 A | 8/1999 | Uehara | 701/41 |
| 5,941,917 A | 8/1999 | Barnes et al. | 701/23 |

\* cited by examiner

*Primary Examiner*—Tan Nguyen
(74) *Attorney, Agent, or Firm*—Quarles & Brady LLP

(57) ABSTRACT

The present invention is a method and apparatus for controlling a steer center position of an automatic guided vehicle (AGV) of the type that follows a wire. As the automatic vehicle follows a wire, the distance of the AGV from the wire is monitored over a given distance, and an average distance from wire calculated. This value is used to determine a steer center position adjustment, which adjusts the steer center position to maintain the AGV within a predetermined distance of the wire or other path. The present invention is useful in accounting for variations between AGV's based on mechanical linkages and manufacturing differences; differences in steer center position when an AGV is driven in a forward or reverse direction; and changes due to environmental conditions.

29 Claims, 8 Drawing Sheets

STEER CONTROL SYSTEM FOR MATERIAL HANDLING VEHICLES

FIELD OF THE INVENTION

The present invention relates to material handling vehicles, and more specifically to control systems for determining a steer center position and controlling steering correction for a material handling vehicle which is automatically guided along a wire.

BACKGROUND

In recent years, changing manufacturing and retail distribution practices have led to significant changes in warehousing practices. Just-in-time manufacturing, for example, makes it necessary for industrial distribution centers to be able to access small quantities of specific materials quickly. Likewise, the advent of on-line and internet shopping has made it increasingly important for retailers to be able to quickly and efficiently locate and retrieve specific items for a number of individual orders. In conjunction with these trends, it has become necessary to store both a greater variety and a greater quantity of goods at each individual warehouse.

To accommodate these changes, automated guided vehicles have become increasingly common. Automated guided vehicles (or AGVs) are vehicles which are guided automatically along an established path such as along a wire in the floor of a warehouse. AGV's can be unmanned vehicles for carrying parts or components in a manufacturing plant or manned vehicles which carry an operator and provide material handling functions such as order picking, lifting, or reaching. When used in conjunction with a central processing system, the storage and retrieval of specific items can be quickly and easily controlled from a central location, essentially without the need for human intervention. These devices, therefore, make warehousing operations both more efficient and less expensive than prior art manual systems.

Although AGVs can increase efficiency and lower the cost of warehousing operations, automatic vehicles present a number of problems for users. To prevent damage to the racking and shelving used to store materials, as well as to the vehicle itself, and to prevent damage to stored materials, for example, the AGV must be prevented from veering into racking at the sides of the path, or into stock stored temporarily in locations within an aisle or pathway. It is important, therefore, that AGVs move within a predetermined, closely defined path.

Due to these restrictions, steering control systems are vitally important in AGVs. One important parameter for controlling the motion of an AGV is the identification of a steer center position. The steer center position identifies the angle at which the steer motor or other steering device must be directed to drive the AGV in a straight direction. To a close approximation, the steer center position can be established by switches or other indicating devices mounted to the steer mechanism. However, errors in this position can be introduced by mechanical linkages and gear systems in the drive system of the vehicle, by environmental factors in a warehouse, or simply due to changes in control as the AGV is used. To prevent wandering due to these various errors, prior art systems often included a "learn" mode for teaching a steer center position to an AGV. In the learn mode, the control system learns the position of a feedback device (such as an encoder) while the AGV is driven along a straight path. While adequate in some applications, however, there are a number of disadvantages associated with the "learn mode" process. First, additional hardware such as key pads or switches are required to establish a learn mode. Second, once established, the steer center position is not automatically adjusted for varying conditions. Furthermore, the learn mode cannot easily adjust for manufacturing errors related to mechanical linkages and home switches, and therefore can make the manufacture of AGVs difficult.

There remains a need, therefore, for an improved method and apparatus for determining a steer center position for an AGV. Such a method would preferably allow an AGV to automatically learn a steer center position during normal operation, and would automatically modify the steer center position as environmental and mechanical conditions change. The method would also account for errors induced by mechanical linkages, environmental conditions, and general usage of the AGV.

SUMMARY OF THE INVENTION

The present invention is a method and apparatus for determining a steer center position for an automatic guided vehicle which follows a wire. As the vehicle moves along a guide wire, the distance of the vehicle from the wire is monitored. At a predetermined maximum travel distance, the average distance from wire over the distance traveled is calculated, and the average distance from wire is used to determine an adjustment to the steer center position. Adjustment to the steer center position, therefore, relies almost entirely on a single variable: the average distance from wire.

The method of the present invention can be used to allow an AGV, and particularly an order picker forklift, or other manned material handling vehicle, to "learn" a steer center position, where an initial steer center position, determined by crossing home switches or other known means, is adjusted by a steer center adjustment value to account for differences in the AGV topology due to manufacturing tolerances, mechanical linkages, differences in steer center position in forward and backward motion, misalignment in the construction of the chassis and other factors. Furthermore, the method can be used to adapt the steer center position for changes induced during use. Such changes can occur, for example, due to wear on mechanical parts, adjustments made during maintenance or service of equipment, warehouse environmental factors, damage to home centering switches or switch-activators, or other factors. The present invention eliminates the need for reliance on accurate home switches and specialized "learn" modes which must be run to establish a steer center position. The present system can also be used to adapt the steer center position during operation, and therefore to maintain the vehicle within a predetermined distance of a predetermined path, particularly a guide wire path.

DETAILED DESCRIPTION OF THE INVENTION

Figure 1:
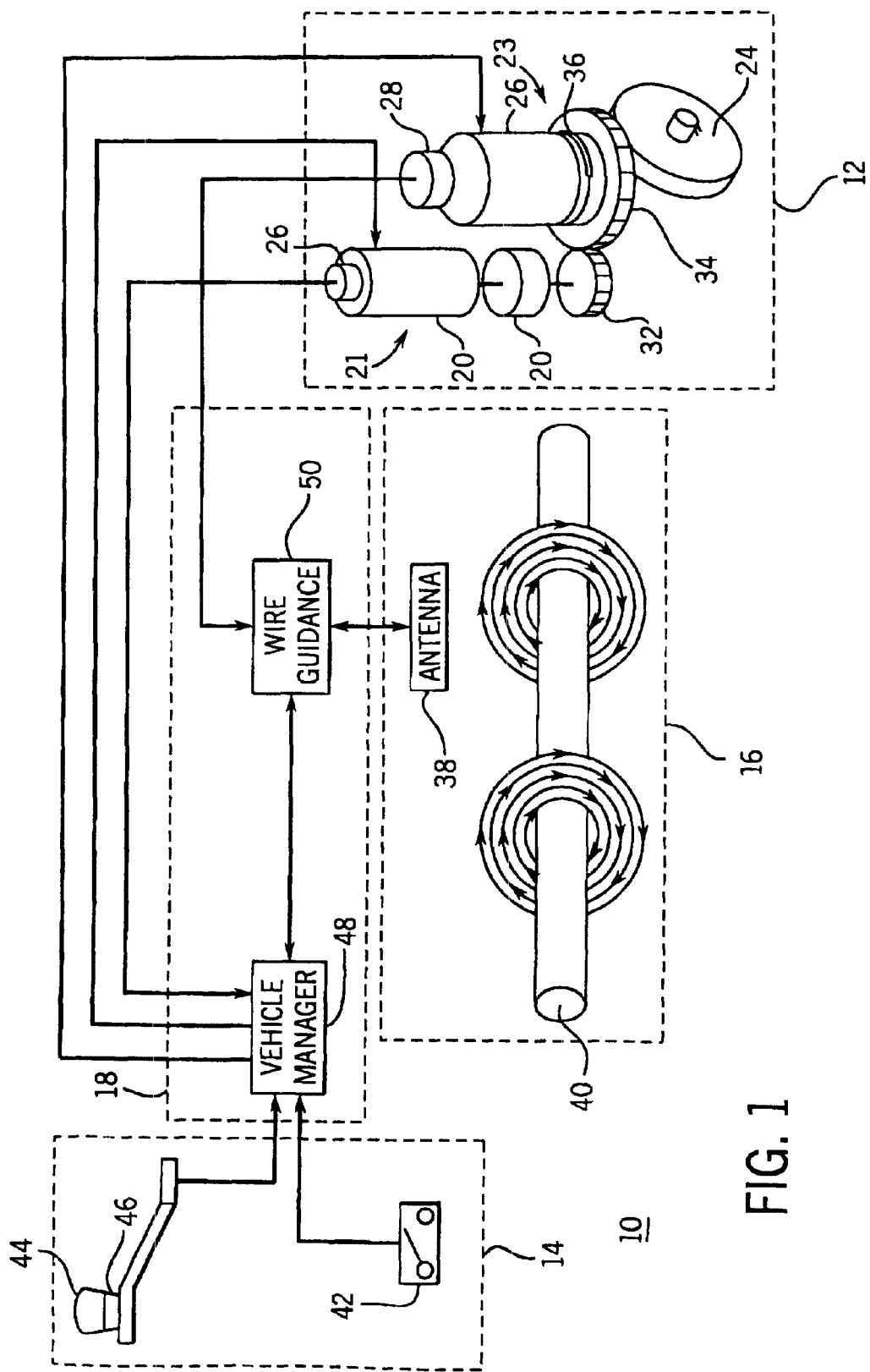
FIG. 1 is a schematic of an AGV constructed in accordance with one embodiment of the invention.

Referring now to the FIGS., and more particularly to FIG. 1, a schematic view of an automatic guided vehicle 10 (AGV 10) constructed in accordance with the present invention is shown. The AGV 10 as shown and described is particularly adapted for use as a manned material handling vehicle such as an order picker, forklift, stacking vehicle, or other warehousing device. However, the principles associated with the present invention can be applied to a number of automated vehicles. The term AGV will be used to refer to all partial or fully automatically guided vehicles, both manned and unmanned.

The AGV 10 comprises four basic systems: a drive system 12, a manual steering system 14, a control system 18, and a distance from wire detection circuit 16. In general, the control system 18 receives AGV position, AGV velocity, and steer feedback data including an initial steer center position from the drive system 12; distance from wire (DFW) data from the wire detection circuit 16; and steer center adjust data from memory or storage components internal to the control system 18. Based on this input data, the control system 18 calculates adjustments to the steer and calculates command signals for the drive system 12 to control the steer direction of the AGV. A specific embodiment of an AGV including each of these systems will be described more fully below.

Referring again to FIG. 1, in one embodiment of the invention, the distance from wire detection circuit 16 comprises a plurality of antennae 38 which are employed to detect the lateral distance of the AGV 10 from the guide wire 40 in accordance, for example, with the method disclosed in U.S. Pat. No. 5,519,296, to Day. U.S. Pat. No. 5,519,296 is hereby incorporated by reference as an example of one method for determining the DFW between the AGV 10 and the wire 40. Other methods known to those of skill in the art could also be employed to determine the DFW.

The manual steering system 18 comprises an AUTO/MANUAL switch 42 which can be selectively activated by the user to remove the AGV 10 from an automatic guided mode (AUTOMATIC mode), and to instead allow the AGV to be navigated by the steer tiller 44 (MANUAL mode). The steer tiller 44 includes a manual steering encoder 46 which provides steering directional information to the control system 18 for selecting a steering direction when the AGV 10 is operated in the MANUAL mode.

Figure 2:
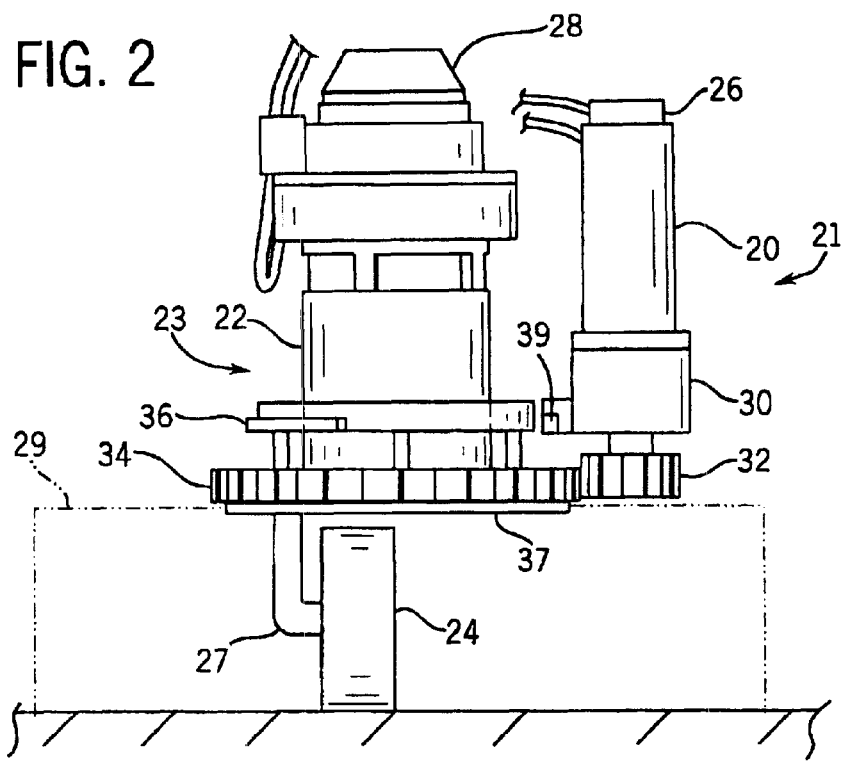
FIG. 2 is a perspective view of the traction and steer system of the AGV of FIG. 1.

Referring now to FIG. 2, the drive system 12 comprises two major parts: a steer motor assembly 21 and a drive motor or traction assembly 23. The steer motor assembly 21 comprises a steer motor 20 coupled to a triple reduction gear box 30 and a pinion gear 32. A steer feedback encoder 26 is coupled to a shaft of the steer motor 20, and provides steer feedback data to the control system 18. Preferably, the drive system 12 also includes one or more home switches 39 operated by the cam 36 to determine an approximate initial steer center or home position of the steer motor prior to movement of the AGV 10. Preferably, the drive system 12 includes a plurality of home switches. The home switches can be located at the initial steer center position or at known offsets from the initial steer center position.

The traction assembly 23 comprises a drive motor 22 coupled to a swivel bearing 37, a cam 36, a ring gear 34, and a drive tire 24. The traction assembly 23 further includes a drive motor encoder 28 which provides AGV position data to the wire guidance control 50. The drive motor encoder 28 can also provide information regarding the direction of motion of the AGV 10, i.e. whether the AGV 10 is moving in the forward (tractor first) or backward (fork first) directions.

Figure 3:
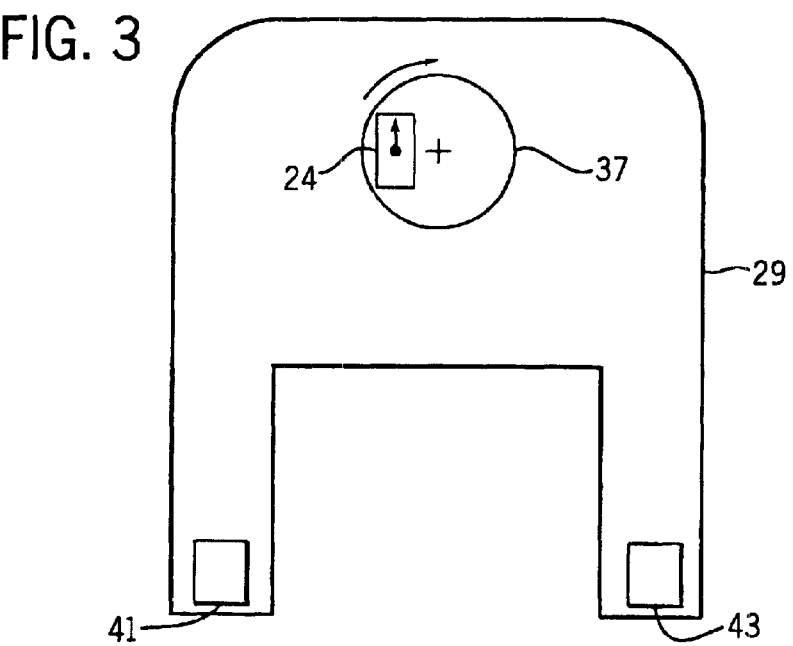
FIG. 3 is an overhead view of the AGV of FIG. 1.

The steer motor assembly 21 is coupled to the traction assembly 23 through the interface of the ring gear 34 and the pinion gear 32 such that, as the pinion gear 32 is rotated, the ring gear 34 causes the tire 24 to rotate on the swivel bearing 37. Because there are four gear meshes between the steer encoder 22 and the actual position of the swivel bearing 37 (namely, the triple reduction gear 30 and the pinion gear 32), there is a significant degree of backlash between the positional data from the steer feedback encoder 26 and the actual steered direction of the tire of the AGV 10. This backlash introduces an error into the steer center position, which can be as much as two degrees depending on the wear of the gears. Furthermore, referring also to FIG. 3, the chassis 29 of the AGV 10 is a tricycle chassis comprising the drive tire 24, and two load tires 41 and 43. In this chassis 29, the drive tire 24 is offset from center. The offset allows the use of a less expensive casting 27 for mounting the tire 24 but also induces a net steering torque on the steered unit which can induce an additional error in the steer center position. In addition, because of the offset, there is a difference in a steer center position when driving in the forward (tractor first) direction and backward (fork first) directions. Additional differences between AGV's exist due to variations in manufacturing, failure to fall within mechanical tolerances, errors in welding the chassis which can cause the truck to "dog track," etc. The combined effect of these errors is an offset between the steer feedback encoder 26 data received by the vehicle manager 48, and the actual steer direction of the AGV 10. To correct for this offset, an adjustment must be made to the instantaneous feedback from the steer feedback encoder 26. The adjustment is equal to the difference between the initial steer center position as determined by the home switches and the actual steer center position, i.e. the steer position at which the AGV 10 travels straight ahead along the wire. Due to mechanical differences encountered in driving the AGV 10 forward or backward, a separate adjustment is acquired for each direction. The magnitude of the steer units adjustment is determined through the steer center adjustment method discussed with reference to FIG. 5 below, which provides adaptive adjustment of the steer center position, to address both mechanical and operational conditions. Although a drive system 12 comprising a steer assembly 21 and traction assembly 23 coupled to a single tire 24 is shown, it will be apparent to one of ordinary skill in the art that, in some applications the steer assembly and traction assembly could each be coupled to a separate tire, wherein the steer assembly and associated tire provide a steer function, and the traction assembly and associated tire provide traction. Other topographies will also be apparent to those of skill in the art.

Figure 4:
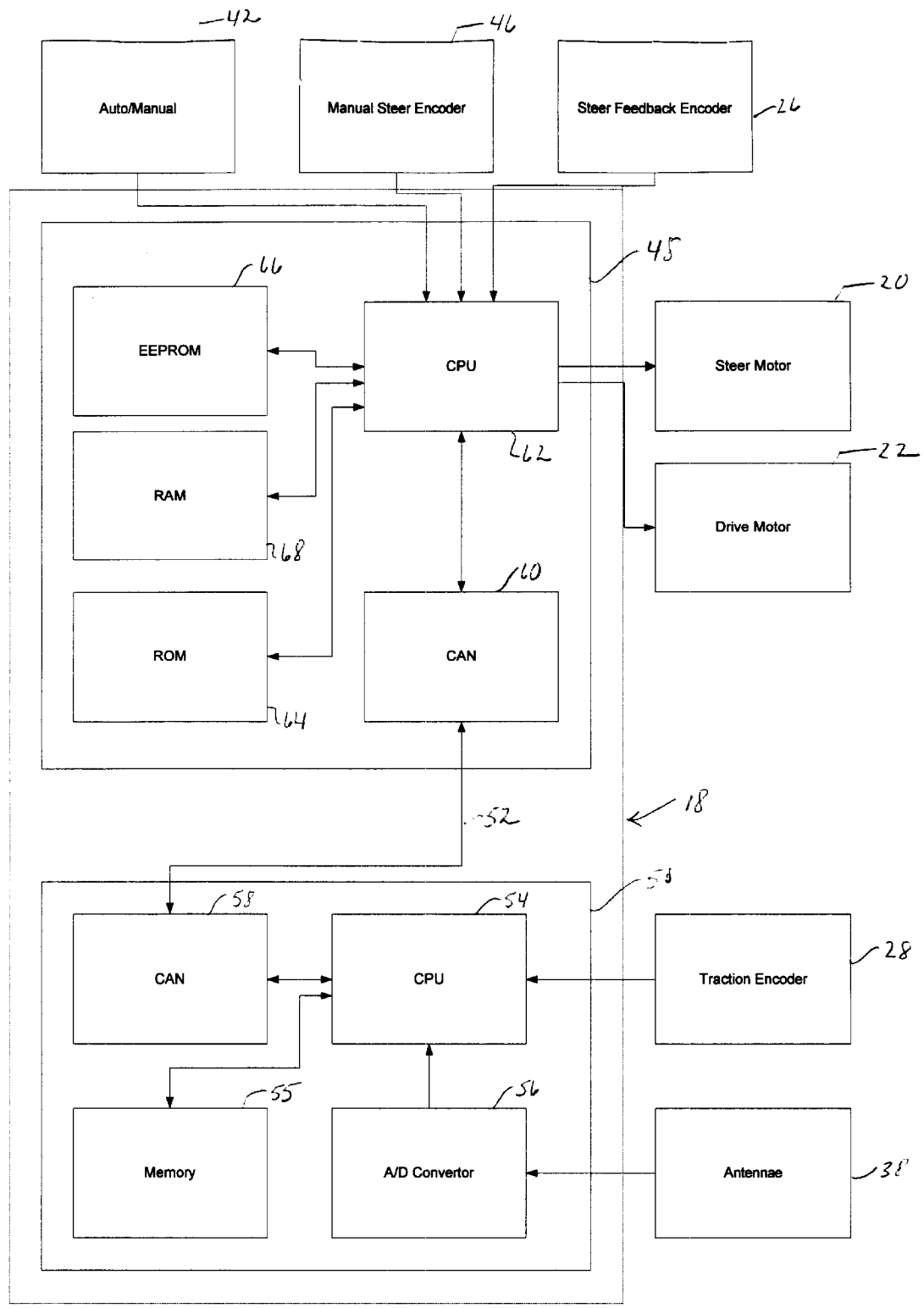
FIG. 4 is a block diagram of the control system of the AGV of FIG. 1.

Referring again to FIG. 1, the control system 18 comprises two control circuits, the wire guidance control 50 and the vehicle manager 48. The wire guidance control 50 and vehicle manager 48 are communicatively coupled via the data bus 52. Referring now to FIG. 4, a block diagram of the control system 18 is shown. The wire guidance control 50 comprises CPU 54, an analog to digital convertor 56, a memory component 55, and a transceiver 58 for transmitting data to and receiving data from the vehicle manager 48 along the data bus 52. The wire guidance control 50 receives analog input signals indicative of the DFW and employs a method of the type described in U.S. Pat. No. 5,519,296, cited above, to calculate a digital DFW value. The wire guidance control 50 also receives AGV positional data from the traction encoder 28. The CPU 54 determines the position of the AGV 10 based on this information, and also calculates a velocity of the AGV 10 by differentiating the positional data. The velocity data provides a scalar speed of the AGV 10, and is signed to indicate a direction of motion. The DFW value, AGV position data, and AGV speed data are all transmitted to the vehicle manager 48 via the data bus 52. As shown in FIG. 4, the transceiver 58 and 60 used in each of the wire guidance control 50 and the vehicle manager 48 is preferably a Controller Area Network (CAN) transceiver, and the data bus 52 is therefore preferably a CAN bus. It will be apparent to those of ordinary skill in the art, however, that other communication methods can also be used.

Referring still to FIG. 4, the vehicle manager 48 can comprise a CPU 62; memory components including read only memory (ROM) 64, a nonvolatile random access memory or electrically erasable programmable read only memory (EEPROM) 66, and random access memory (RAM) 68; and a transceiver 60 for transmitting data to and receiving data from the wire guidance control 50. Other hardware and memory configurations for both the wire guidance control 50 and vehicle manager 48 will be apparent to those of skill in the art. In particular, a number of known microprocessors, and particularly microcontrollers which include suitable on-board I/O devices, memory, signal convertors, and/or transceivers can be used advantageously in these circuits. Furthermore, a number of different types of memory and storage devices can be used in place of those described, such as an erasable programmable read only memory or flash memory in the place of the ROM 64.

In the MANUAL mode, as determined by the position of the AUTO/MANUAL switch 42, the vehicle manager 48 receives input data from the manual encoder 46, which establishes a command steer direction; the steering feedback encoder 26, which provides steer feedback data regarding the actual steer position of the steer motor 20; and the traction encoder 28 which provides the velocity and actual position data for the AGV 10 to the vehicle manager 48 and to the wire guidance control 50 through the data bus 52. The command steer direction from the manual encoder 46 and the steer feedback data from the steering feedback encoder 26 are employed in a typical control loop for providing a control signal to drive the steer motor 20 to maintain the direction of the AGV 10 in the direction requested by the manual encoder 46.

In the AUTOMATIC mode the steer motor 20 is initially slewed to determine an initial steer center position. Preferably, the home switches 39 established both a forward and backward steer center position. The steer center position is adjusted by adding the stored forward and backward steer center position values, respectively, the vehicle manager 48 determines a command steer direction for directing motion of the steer motor 20 from the DFW data, which is proportional to the required command values to drive the AGV 10 along the wire. The vehicle manager 48 also receives data from the steer feedback encoder 26 which is stored in RAM 68 and which is adjusted by the steer center adjustment value retrieved from the EEPROM 66, to account for mechanical linkages and other factors as described above. The vehicle also receives AGV position, and AGV velocity data from the wire guidance control 50 via the data bus 52. The DFW data, and the adjusted steer feedback data from the steer feedback encoder 26 are employed in a typical control loop for providing a control signal to drive the steer motor 20 to maintain the direction of the AGV 10 in the direction requested.

During AUTOMATIC operation, the vehicle manager 48 also monitors the average lateral DFW and determines a steer center adjustment value such that the AGV 10 "learns" the actual steer center and can be maintained within a reasonable distance of a predetermined path as noted above, an initial steer center position is determined by the position of the home switches 39 and the stored forward and backward steer center adjustment value, described more fully below. The steer center adjustment level is modified in operation based on the average DFW over a predetermined distance, also as described more fully below.

Figure 5:
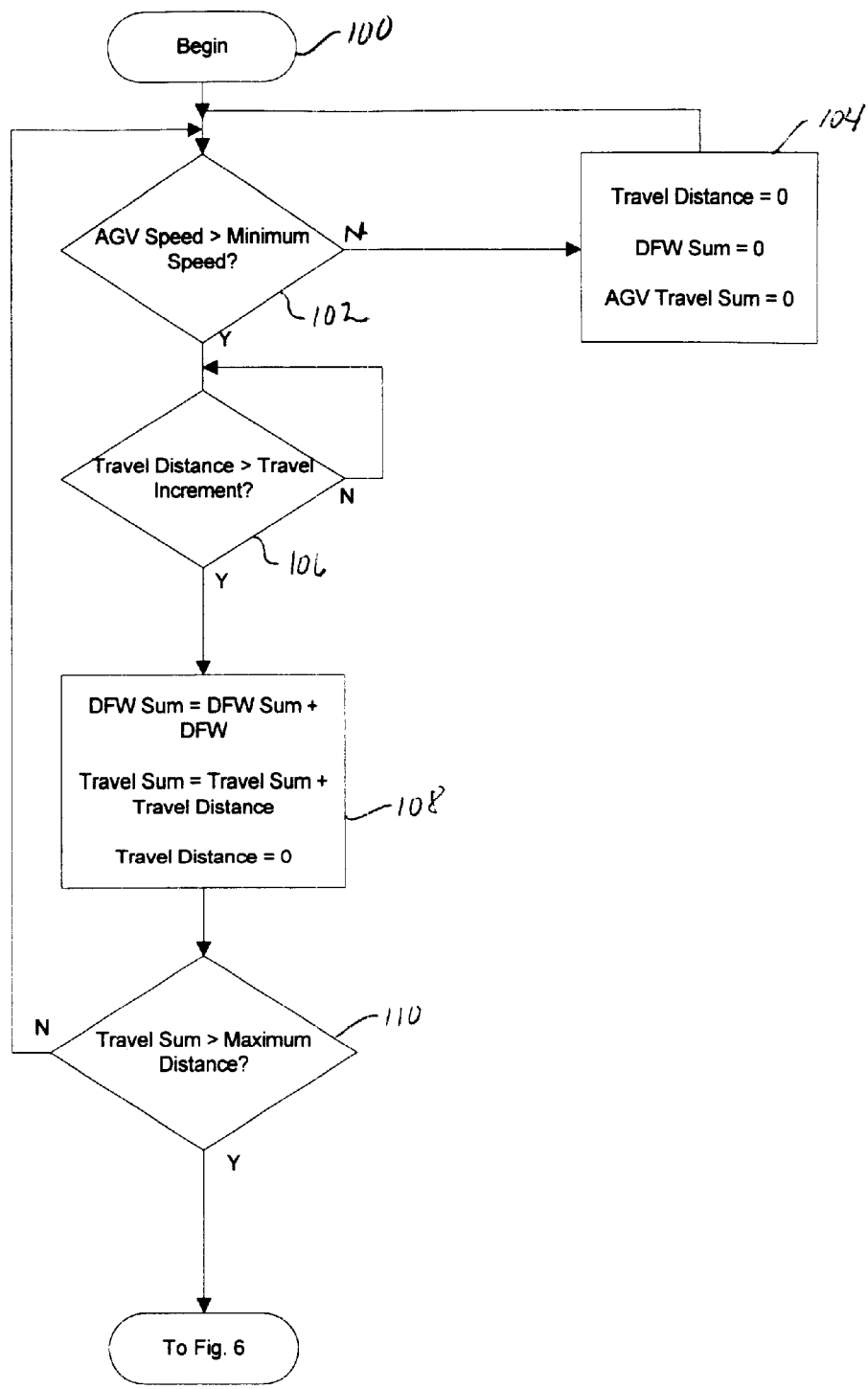
FIG. 5 is a flow chart for a method for determining a steer center position adjust for the AGV of FIG. 1.

Referring now to FIG. 5, a flow chart of the method employed by the vehicle manager 48 to determine a steer center adjustment value is shown. In the description below, the following terms will be used:

Minimum Speed—a predetermined minimum speed level which the AGV must exceed before DFW data is examined AGV Speed—the instantaneous speed of the AGV Travel Increment—a predetermined incremental travel distance along the length of the wire at which DFW readings are taken for the AGV Travel Sum—an ongoing count of the number of Travel Increments an AGV has traveled DFW Sum—a progressive sum of DFW measurements taken at each Travel Increment Travel Distance—an ongoing measure of the distance traveled by the AGV between Travel Increments Maximum Distance—a predetermined maximum distance comprising a predetermined integer number of Travel Increments DFW Average—the average DFW determined as the DFW Sum divided by the Maximum Distance On power-up of the AGV 10, the steer motor 20 is rotated to activate the home switches.

Each home switch provides a signal indicative of a known steer position for calibrating actual steer position of the AGV 10 versus the steer feedback encoder 26 data. Through this process, an initial steer center position for each of the forward (Forward Steer Center Position) and backward directions (Backward Steer Center Position) of the AGV 10 is determined based on the crossing of the home switch and the steer feedback encoder 26 data.

The steer feedback encoder data is stored as a variable in RAM 68 and is continually updated during operation. The DFW data is also monitored during operation of the vehicle to correct for errors in the steer center position. As noted above, errors may be induced through mechanical linkages, such as the four gear meshes between the steer encoder 26 and tire 24 described above, errors in chassis welding, bent or loose parts associated with the home switches and home switch activation equipment, or other factors. Although an incremental steer feedback encoder 26 has been described, it will be apparent that an absolute encoder could also be used.

Figure 6:
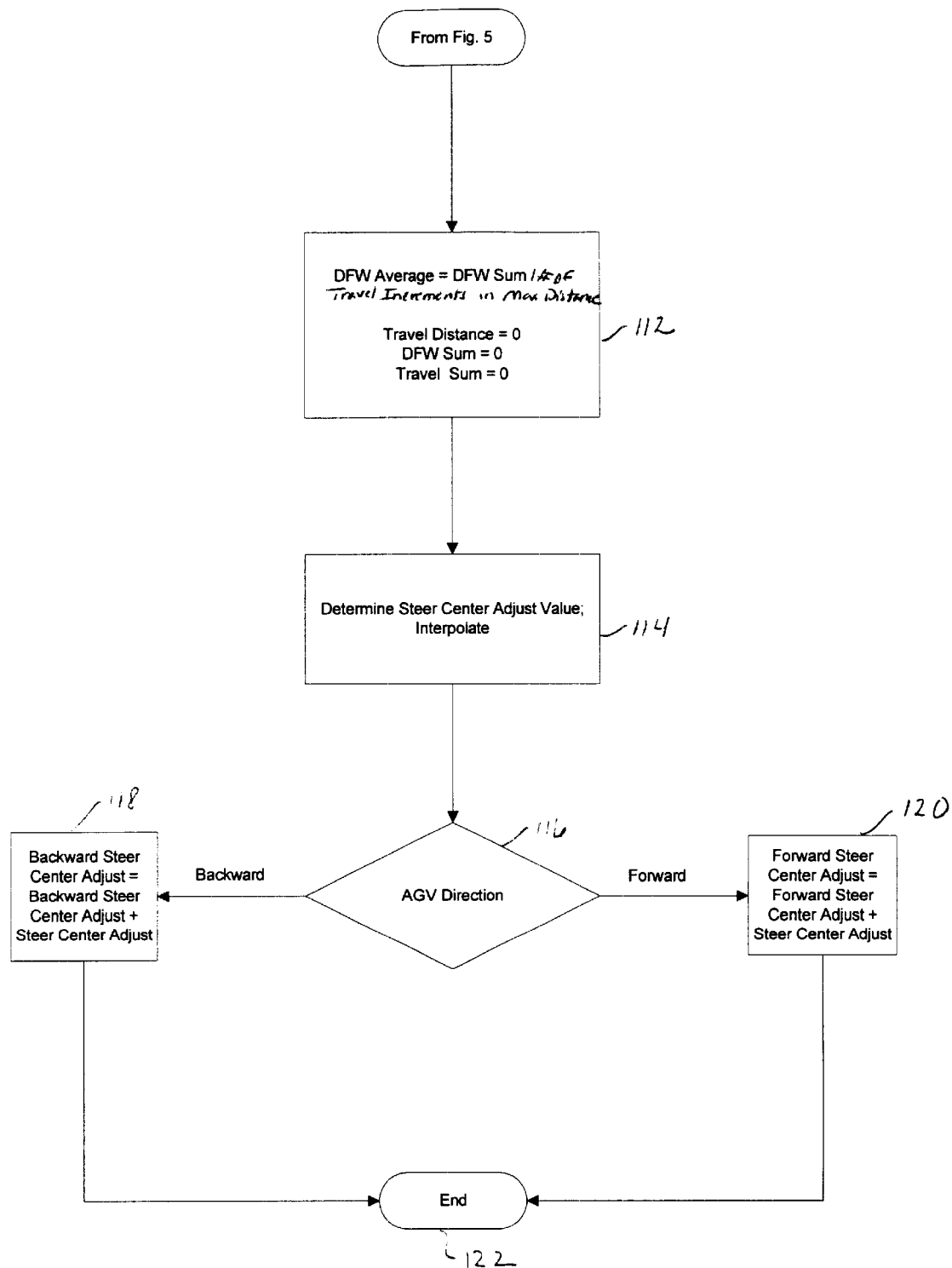
FIG. 6 is a continuation of the flow chart of FIG. 5.

Referring again to FIG. 5, when the AGV 10 is in the AUTOMATIC mode as determined by the AUTO/MANUAL switch 42, and is driven in either direction, the vehicle manager 48 continually monitors the AGV Speed (step 102) through data received from the wire guidance control 50. If the AGV Speed is determined to be below the Minimum Speed, the Travel Distance, DFW Sum, and Travel Sum are set to zero (step 104). When the AGV Speed is found to exceed the Minimum Speed, the vehicle manager 48 monitors the Travel Distance until the Travel Distance is equal to or greater than the Travel Increment (step 106). When the Travel Increment is met or exceeded, the DFW is retrieved from the data bus 52 and is summed with the DFW Sum, the Travel Sum is incremented to include the Travel Increment, and the Travel Distance is reset to zero (step 108). The AGV Speed is monitored, DFW readings are taken, and the DFW Sum and Travel Sum are incremented at each Travel Increment until the Maximum Distance is reached (step 110). Referring now to FIG. 6, when the Maximum Distance is reached, the DFW Average is determined by dividing the DFW Sum by the number of Travel Increments in the Maximum Distance (step 112), and the DFW Sum, Travel Sum, and Travel Distance are reset to zero.

The DFW Average value is used as an index into the look-up table stored in the ROM 64 of the vehicle manager 48. As shown in step 114, the look-up table correlates steer center position adjustment values to the DFW Average. Linear interpolation is used to determine steer center adjustment values between points on the look-up table.

After the steer center adjustment value is interpolated, the direction of motion of the AGV 10 is determined, as described above with reference to the drive motor encoder 28 (Step 116). The steer center adjustment value is added to the steer center adjustment (the Forward or Backward Steer Center Adjustment) value associated with the determined direction of motion (steps 118 and 120). The steer center adjustment value can then be stored as a variable in RAM 68, or can be stored in EEPROM 66 as described more fully below. The steer center adjustment value is added to the steer feedback encoder data to account for differences between actual steer unit position and steer feedback encoder data 26 due to any of the factors discussed above. The adjusted steer feedback data is used by the vehicle manager 48 along with DFW data as a feedback to a PID or other standard control loop to maintain the AGV 10 within a predetermined distance of the guide wire 40.

In a preferred embodiment of the invention, the AGV Minimum Speed was selected to be one mile per hour, the AGV Travel Increment was selected to be a distance of one foot, and the AGV Maximum Distance was selected as a distance of ten feet. These selected values were determined experimentally to adjust the steer center position efficiently even when the AGV moves along short aisles. However, it will be apparent that other values could be used, and may be advantageous for AGV's with different mechanical configurations, or which travel in different environments and conditions. Furthermore, although a specific method for calculating a DFW Average has been shown and described, it will be apparent that a number of different known methods for calculating average values could be used. Additionally, it is also possible to vary the increments at which DFW readings are taken, and make other modifications to the method shown without departing from the scope of the invention. Furthermore, the Travel Increment can be determined as a function of data from the drive motor encoder 28, or calculated by the vehicle manger 48 as a function of AGV speed multiplied by time.

Figure 7:
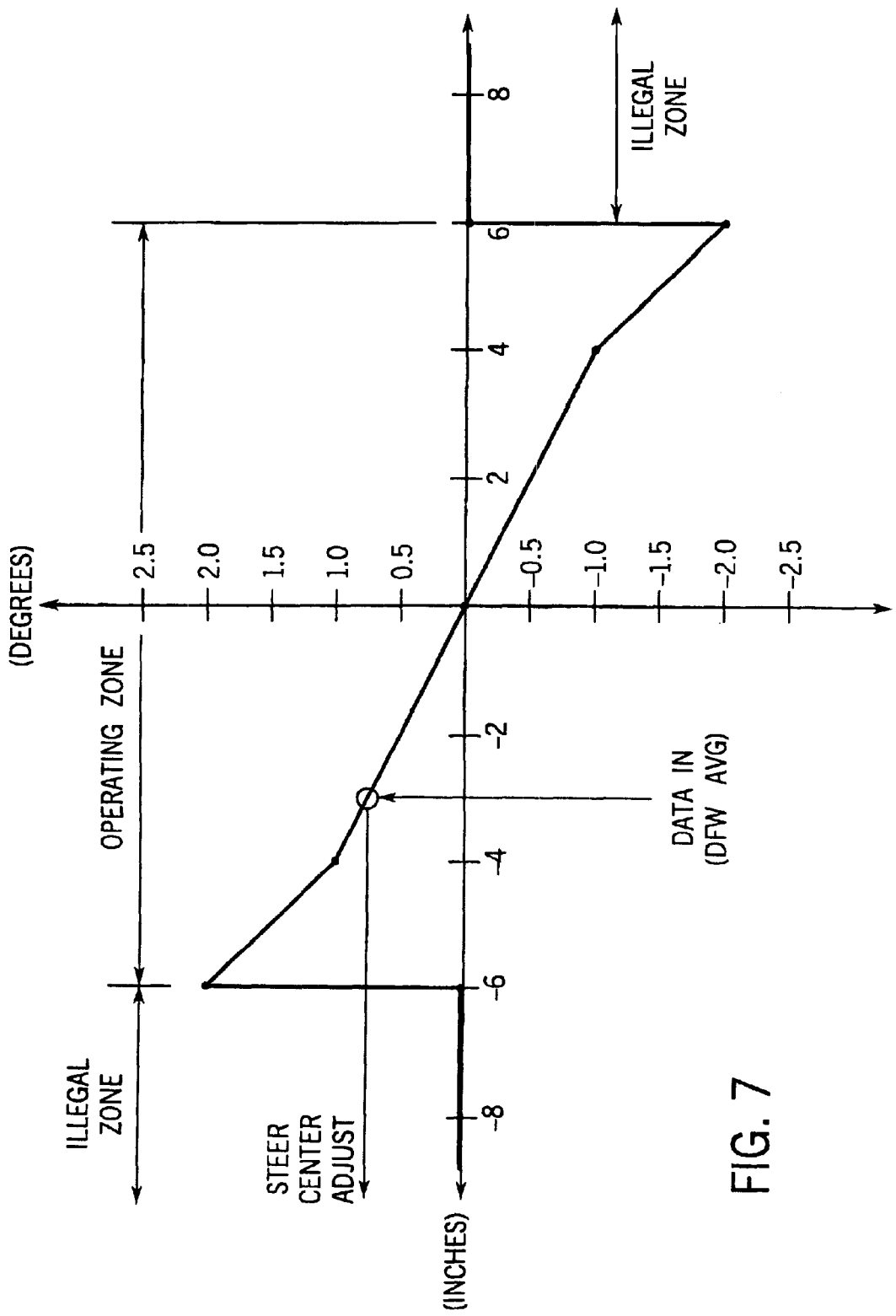
FIG. 7 is a graph illustrating a typical steer center position adjust versus average distance from wire

Referring to FIG. 7, a graph illustrating the DFW Average versus steer center adjust value is shown. Here, DFW Average in inches is plotted versus a correction of the steering angle in degrees. In this embodiment, the steer center adjustment is non-linear, in that a comparatively large steer center adjust is applied to a large DFW average, and a smaller steer unit adjust factor is applied when the DFW average is relatively small. This adaptive correction function prevents oscillation of the AGV 10 from one side to another when the DFW is small, and also provides rapid conversion for large errors. If the DFW Average extends outside of a predetermined range, an illegal zone is entered and the steer center adjust is set to zero. An example of a look-up table constructed from the graph of FIG. 5, could, for example, include an array of steer center adjustment values in degrees. As noted above, the DFW Average is used as an index, and values between the data points are interpolated. Although a non-linear graph is shown, it will be apparent that in some applications a linear relationship between DFW average and steer center adjust may be appropriate. Furthermore, the adjustment data shown was developed for a specific application, and can be adapted as necessary for different mechanical configurations or environmental conditions.

Preferably, once a steer center adjustment value is determined, it is stored in memory for later retrieval. The preferred memory storage is the electrically erasable programmable read only memory EEPROM 66 of the vehicle manager 48, or a similar nonvolatile storage device which retains the value during power-down of the vehicle but which allows changes to the value when necessary. To prevent wear out of the EEPROM 66 from overuse, the number of times the EEPROM 66 is erased and overwritten is preferably limited to, for example, a single write for every power-on of the AGV, or to a write when the steer center adjustment value exceeds a predetermined maximum limit value.

Figure 8:
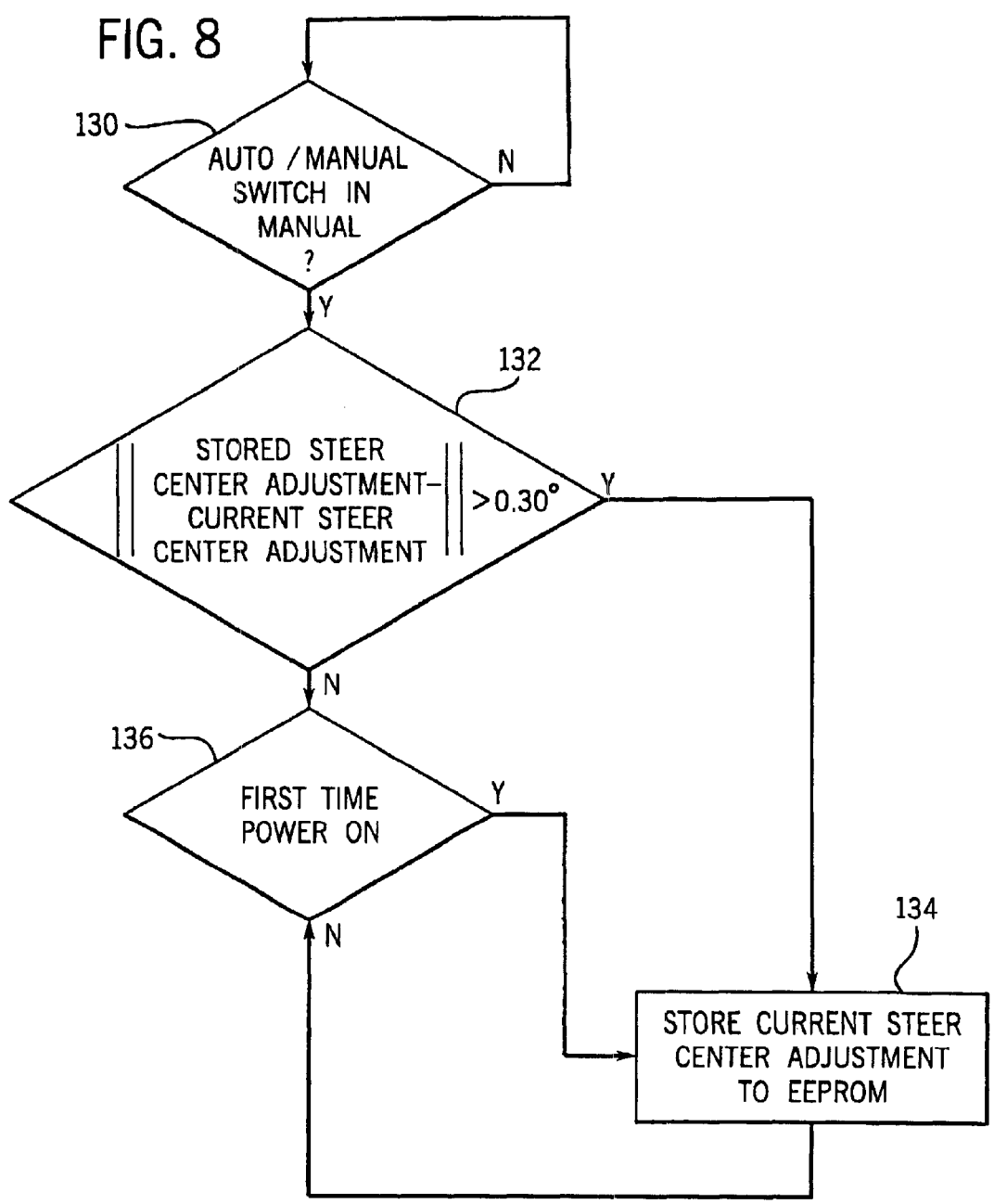
FIG. 8 is a flow chart illustrating a method for storing adjusting steer center offset in an EEPROM or other rewritable memory location.

A preferred method for limiting writes to the EEPROM 66 is illustrated in the flow chart of FIG. 8. Here, a steer center adjustment value is written to the EEPROM 66 only when the AUTO/MANUAL switch 42 is turned to the MANUAL position, and either (1) the AUTO/MANUAL switch 42 has been turned to the MANUAL position for the first time in a given-power up session, or (2) the working copy stored in RAM 68 differs from the saved copy stored in EEPROM 66 by more than a predetermined maximum value, here 0.30 degrees. To achieve this result, the AUTO/MANUAL switch 42 is monitored in step 130. If the AUTO/MANUAL switch 42 is in the MANUAL mode, a comparison is made between the stored steer center adjustment in EEPROM 66 and the current steer center adjustment in RAM 68 (step 132). If the absolute difference between these values is greater than the predetermined maximum value, the current steered center adjustment stored in the RAM 68 is stored in the EEPROM 66 (step 134). If the absolute value does not exceed the predetermined maximum value, a determination is made whether this is the first time the AUTO/MANUAL switch 42 has been turned into the MANUAL position during the current power-on session. This information can be established, for example, by a flag which is set and stored in the RAM 68 when the switch is thrown, or by other means known to those of skill in the art (step 136). If the AUTO/MANUAL switch 42 has been put in the MANUAL position for the first time, the current steer center adjustment is stored in EEPROM 66, as shown in step 134.

Figure 9:
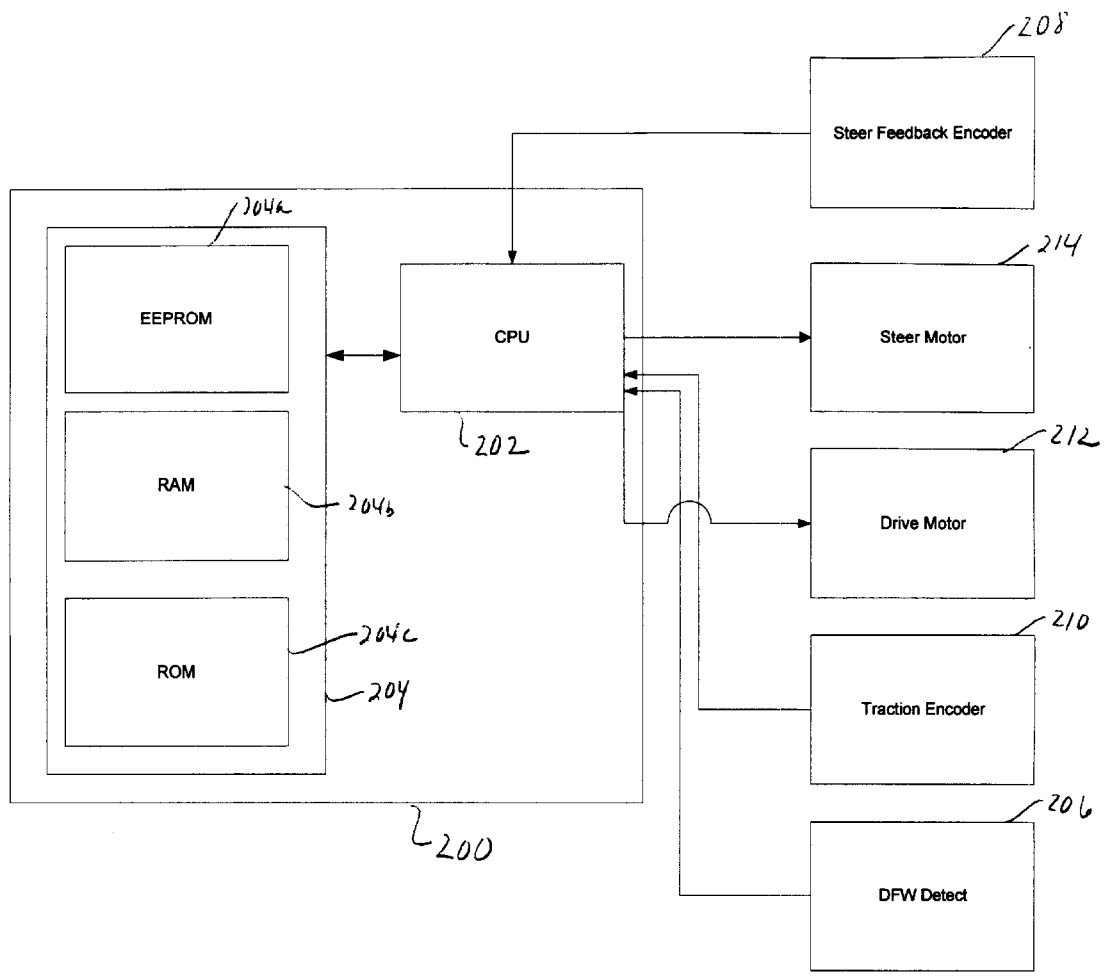
FIG. 9 is a block diagram of a simplified control system for an AGV constructed in accordance with the present invention.

Although a specific AGV 10 and a specific control system have been shown and described, it will be apparent to one of ordinary skill in the art that a number of modifications could be made to the described elements without affecting the scope of the invention. For example, referring to FIG. 9, a block diagram illustrating simplified control system 200 for a wire guided AGV constructed in accordance with the present invention is shown. The simplified control system 200 comprises a CPU 202 and a memory component 204 comprising a nonvolatile random access memory component (or EEPROM) 204a, a random access memory component 204b, and a read only memory component 204c. Inputs to the control system 200 are provided by a traction feedback encoder 210, a steering feedback encoder 208, and a DFW detector 206. Outputs from the control system 200 are provided to a steer motor 214 and a drive motor 212. The control system 200 can comprise one or more microprocessor or microcontroller, including appropriate I/O interfaces, A/D convertors or other signal processing elements, and memory components such as those delineated as components 204a–c. Furthermore, while the construction of the AGV 10 is shown to include an offset tire and backlash in the steer motor assembly 12, the disclosed steer center position adjust method is applicable to all automatic guided vehicles with a three wheel "tricycle" steering geometry and in a conventional 4 wheel geometry with 2 steered wheels. The steer control system of the present invention can be employed to correct for any number of mechanical linkage, environmental manufacturing errors, or usage induced errors to the steer center position. Furthermore, the construction of the steer system 12 can be geared in a number of ways known to those of skill in the art. For example, the steer feedback encoder 26 can be geared directly off the ring gear. This construction would reduce the number of gear meshes but increase costs. In addition, other types of data storage could be used in place of the described look up table and in some applications, steer units adjust values could be calculated rather than stored as tabular data. As noted above, there are a number of known ways for performing the calculations of the steer center adjust method, and modifications of this type can be made within the scope of the invention.

I claim:

1. A method for determining a steer center position for an automatic guided vehicle of the type which travels along a guide wire, the method comprising the following steps:

monitoring a distance traveled by the automatic guided vehicle;

establishing a plurality of predetermined travel increments in a predetermined total distance;

determining a distance from wire value for the automatic guided vehicle at each predetermined travel increment;

calculating an average distance from wire over the number of predetermined travel increments in the predetermined total travel distance; and adjusting the steer center position, wherein the adjustment is a function of the average distance from wire.

2. The method as defined in claim 1, further comprising the steps of storing a forward steer center position for travel in a first direction and a backward steer center position for travel in a second direction.

3. The method as defined in claim 2, further comprising the steps of determining whether the direction of travel of the automated guided vehicle is forward or backward and adding the adjustment to the steer center position to the forward steer center position when the direction is forward and to the backward steer center position when the direction is backward.

4. The method as defined in claim 1, wherein the step of adjusting the steer center position comprises retrieving an adjustment value from a look-up table which correlates the average distance from wire to a steer center adjust value.

5. The method as defined in claim 4, wherein linear interpolation is used to determine the steer center adjust value between points on the look-up table.

6. The method as defined in claim 4, further comprising the step of assigning zero to the steer center adjust value when the distance from wire value is outside of a predefined range of accepted values.

7. The method as defined in claim 1, further comprising the steps of determining a speed of the automatic guided vehicle, comparing the speed to a predetermined minimum speed value, and measuring the first predetermined travel increment from the position at which the automatic guided vehicle exceeds the predetermined minimum speed.

8. The method as defined in claim 4, wherein the steer center position adjustment values of the look-up table are selected to prevent oscillation of the automatic guided vehicle on the wire when the average distance from wire is small.

9. The method as defined in claim 4, wherein the look-up table includes relatively small steer center adjustment values when the average distance from wire is small, and relatively large steer center adjustment values when the average distance is large.

10. The method as defined in claim 1, wherein the steer center adjustment values increase non-linearly as the average distance from wire increases.

11. The method as defined in claim 1, wherein the predetermined travel distance increment is one foot and the predetermined total distance is ten feet.

12. The method as defined in claim 7, wherein the predetermined minimum speed value is one mile per hour.

13. The method as defined in claim 1, further comprising the steps of summing the distance from wire values for each of the predetermined travel increments and calculating the average distance from wire as the sum of the distance from wire values over the number of predetermined travel increments in the predetermined total travel distance.

14. The method as defined in claim 1, wherein the step of establishing a plurality of predetermined travel increments comprises determining each predetermined travel increment by integrating the speed of the AGV over the time that the AGV has been in motion.

15. An apparatus for adjusting a steer center position for an AGV, the apparatus comprising:

a central processing unit;

a distance from wire detector electrically coupled to the central processing unit;

a drive traction feedback encoder electrically coupled to the central processing unit;

a steer feedback encoder electrically coupled to the central processing unit;

a read only memory component electrically coupled to the central processing unit, the read only memory component storing data correlating distance from wire to steer center position adjust data; and a nonvolatile random access memory component electrically coupled to the central processing unit, the nonvolatile random access memory component storing a steer center position value, wherein the central processing unit is programmed to:

retrieve the steer center position value from the nonvolatile random access memory;

monitor an output signal from the drive traction encoder to determine an instantaneous travel position of the AGV and a total travel distance;

monitor an output signal from the distance from wire detector to determine an instantaneous distance from wire value at a plurality of travel positions;

monitor an output signal from the steer feedback encoder:

calculate an average distance from wire over the total travel distance;

retrieve a steer center position adjust value correlated to the average distance from wire from the read only memory; and adjust the output signal from the steer feedback encoder by the steer center position adjust value.

16. The apparatus as defined in claim 15, wherein the nonvolatile random access memory comprises an electrically erasable read only memory.

17. The apparatus as defined in claim 15, wherein the central processing unit is further programmed to differentiate the output signal from the traction encoder with respect to time to determine an instantaneous speed, to compare the instantaneous speed to a predetermined minimum value, and to monitor travel distance and distance from wire data only when the predetermined speed is exceeded.

18. The apparatus as defined in claim 15, wherein the central processing unit is further programmed to monitor the state of an automatic/manual switch, and to write the steer center position value to the nonvolatile random access memory when the state of the automatic/manual switch is changed from automatic to manual for the first time in a given power-up session.

19. The apparatus as defined in claim 15, wherein the central processing unit is further programmed to monitor the state of an automatic/manual switch, and to write the steer center position value to the nonvolatile random access memory when the state of the automatic/manual switch is set to manual and the new steer center position value differs from the steer center position value by an amount greater than a predetermined value.

20. An automatic guided vehicle (AGV) of the type that follows a wire, the AGV comprising:

a steering assembly including a steer motor and a steer feedback encoder; a traction assembly including a drive motor, a drive motor encoder, and a drive tire, the traction assembly being coupled to a tractor chassis of the AGV to provide a motive force to the AGV;

a control system, electrically coupled to the steer motor, the steer feedback encoder, the drive motor, and the drive motor encoder; and a distance from wire detector electrically coupled to the control system, wherein the control system is programmed to:

receive a feedback position signal from the drive motor encoder, a distance from wire signal from the distance from wire detector, and steer encoder feedback data from the steer feedback encoder;

calculate an average distance from wire over a predetermined distance;

calculate an adjustment of a steer center position based on the average distance from wire; calculate an adjusted steer encoder feedback as the sum of the steer feedback encoder data and the adjustment of the steer center position.

calculate a command to the steer motor based on feedback from the distance from wire detection and the adjusted steer encoder feedback.

21. The automatic guided vehicle as defined in claim 20 further comprising a plurality of gears, wherein the steer assembly is coupled to the traction assembly through a plurality of gear meshes such that the steer encoder data is offset from the actual direction of the automatic guided vehicle by backlash in the gear meshes.

22. The automatic guided vehicle as defined in claim 20, wherein the traction assembly includes a drive tire that is offset from the center of the automatic guided vehicle.

23. The automatic guided vehicle as defined in claim 18, wherein the steering assembly is coupled to a steer tire.

24. The automatic guided vehicle as defined in claim 20, wherein the control system calculates the average distance from wire over a predetermined distance by performing the following steps:

calculate a speed of the automatic guided vehicle;

compare the speed to a predetermined minimum speed;

when the speed of the automatic guided vehicle exceeds the predetermined minimum speed, begin to calculate a travel distance;

compare the travel distance to a predetermined travel increment;

at each predetermined travel increment up to a maximum travel distance, storing a distance from wire value at each travel increment;

when the maximum travel distance is reached or exceeded, calculating a sum of the distance from wire measurements and calculating an average distance from wire over the maximum distance.

25. A method for tuning a steer center position of an automatic guided vehicle of the type which travels along a guide wire, the method comprising the following steps:

slewing a motor to trip a home switch;

storing an initial steer center position correlating to the position at which the home switch is tripped;

monitoring a distance traveled by the automatic guided vehicle; establishing a plurality of predetermined travel increments in a predetermined total distance;

determining a distance from wire value for the automatic guided vehicle at each predetermined travel increment;

calculating an average distance from wire over the number of predetermined travel increments in the predetermined total travel distance; and adjusting the initial steer center position to account for differences between the initial steer center position and the steer center position, wherein the adjustment is a function of the average distance from wire.

26. The method as defined in claim 25, further comprising the step of adjusting the initial steer center position by a steer center adjustment prior to determining the distance from wire.

27. The method as defined in claim 25, further comprising the step of storing a steer center adjustment to the initial steer center position in both the forward and backward travel directions.

28. The method as defined in claim 25, wherein the motor is a steer motor.

29. The method as defined in claim 25, further comprising a second home switch.

* * * * *